July 3, 1956 N. R. MILLER 2,753,164
HUMIDITY CHAMBER

Filed Oct. 31, 1952 3 Sheets-Sheet 1

INVENTOR
NORMAN R. MILLER

BY

ATTORNEYS

July 3, 1956

N. R. MILLER 2,753,164

HUMIDITY CHAMBER

Filed Oct. 31, 1952

INVENTOR
NORMAN R. MILLER

BY
ATTORNEYS

July 3, 1956  N. R. MILLER  2,753,164
HUMIDITY CHAMBER
Filed Oct. 31, 1952  3 Sheets-Sheet 3

INVENTOR
NORMAN R. MILLER

BY
*J. D. O'Brien*
*R. M. Hicks*
ATTORNEYS

United States Patent Office 2,753,164
Patented July 3, 1956

2,753,164
HUMIDITY CHAMBER

Norman R. Miller, Bristol, Conn., assignor to the United States of America as represented by the Secretary of the Navy Application October 31, 1952, Serial No. 318,145

2 Claims. (Cl. 261—15)

(Granted under Title 35, U. S. Code (1952), sec. 266)

The invention described herein may be manufactured and used by or for the Government of the United States of America for governmental purposes without the payment of any royalties thereon or therefor.

The present invention relates to a new and improved device for automatically controlling the relative humidity of the atmosphere within an enclosed chamber and more particularly to an apparatus for testing the component parts and materials used in electronic and electrical equipment arranged within the test chamber by subjecting such parts to atmospheric changes periodically. Such changes being accomplished by a temperature controlled water spray through which air at room temperature is forced by blower means, the air is heated and/or cooled by the spray water depending on the prevailing phase of the test cycle and the desired condition under which the specimen is adapted to be tested. The temperature of the spray water is controlled by a pair of pre-set thermostats either of which may be selected as the timing device, settable at will to different settings, is actuated, whereupon the device will function for a predetermined period of time such, for example, as from 20 to 40 minutes. However, the device is adapted to continue to repeat the selected cycle of operation until the control switch is actuated to an open position. The cycle of operation of the device is accomplished by periodically heating and/or cooling the air in the aforesaid chamber while maintaining the relative humidity of 95%. Furthermore, the device is provided with an inclined cover disposed above the rack upon which the specimen is arranged during the testing operation, the cover arrangement being adapted to cause the condensed moisture formed thereon during the testing operation to drain downwardly toward one side portion of the unit casing thereby to prevent the aforesaid moisture from falling on the specimen and thus by this arrangement it is possible to maintain the specimen free from moisture a more accurate and conclusive test thereon may be made.

Accordingly, an object of the present invention is to provide a new and improved device of the aforesaid character wherein means are provided for controlling the temperature and humidity condition within an enclosed chamber.

Another object of the invention is to provide a humidity unit wherein the humidity cycle thereof is controlled by periodically heating and/or cooling of the air therein, and in which means are provided for causing the cycles to continue for a predetermined period of time respectively.

Another object of the invention is to provide a device for testing the component parts and materials used in electronic and electrical equipment by subjecting such parts and materials to atmospheric change as the air therein is heated and/or cooled by spray water, and in which means are settable at will to different settings for controlling the temperature of the spray water.

Still another object of the invention is the provision of a humidity test unit composed of transparent material whereby the specimen under test may be readily observed during the testing operation, and in which inclined cover means prevent the condensed moisture from falling on the specimen under test.

Other objects and many of the attendant advantages of this invention will be readily appreciated as the same becomes better understood by reference to the following detailed description when considered in connection with the accompanying drawings wherein:

Fig. 1 is a central longitudinal section view of the device of the present invention;

Figs. 2 and 3 are sectional views taken on the lines 2—2 and 3—3 of Fig. 1 respectively;

Figure 1:
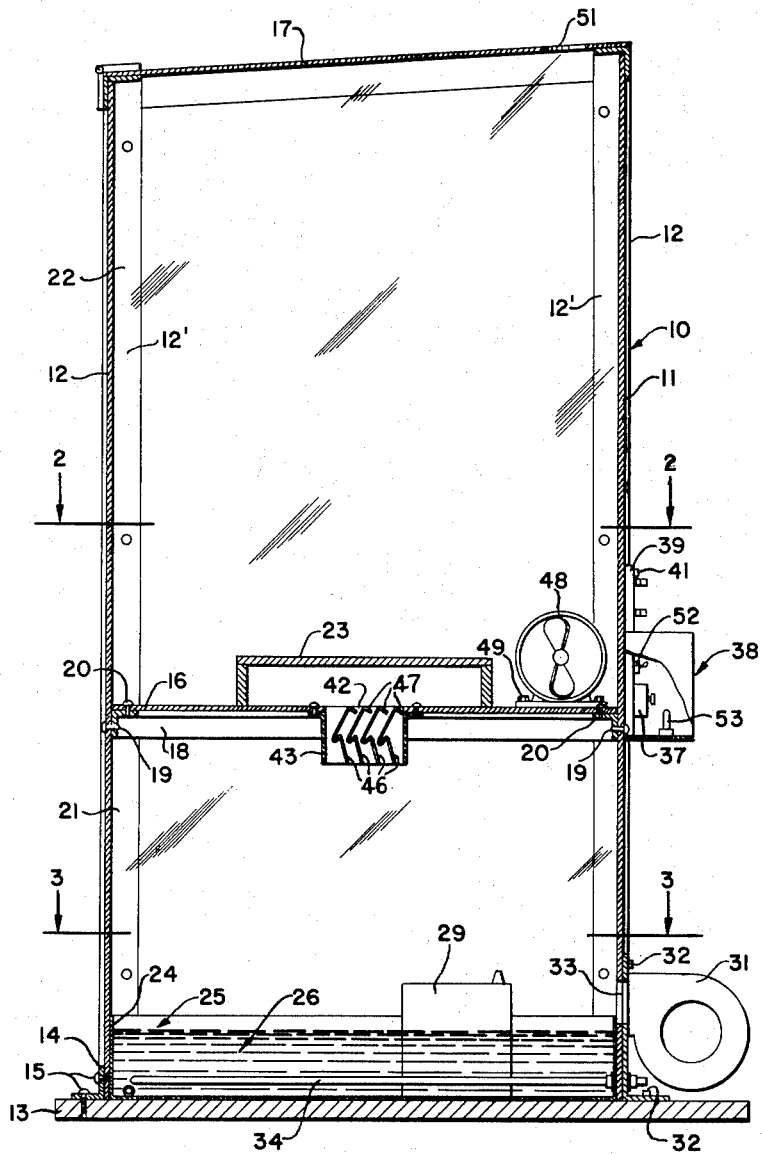
Figure 2:
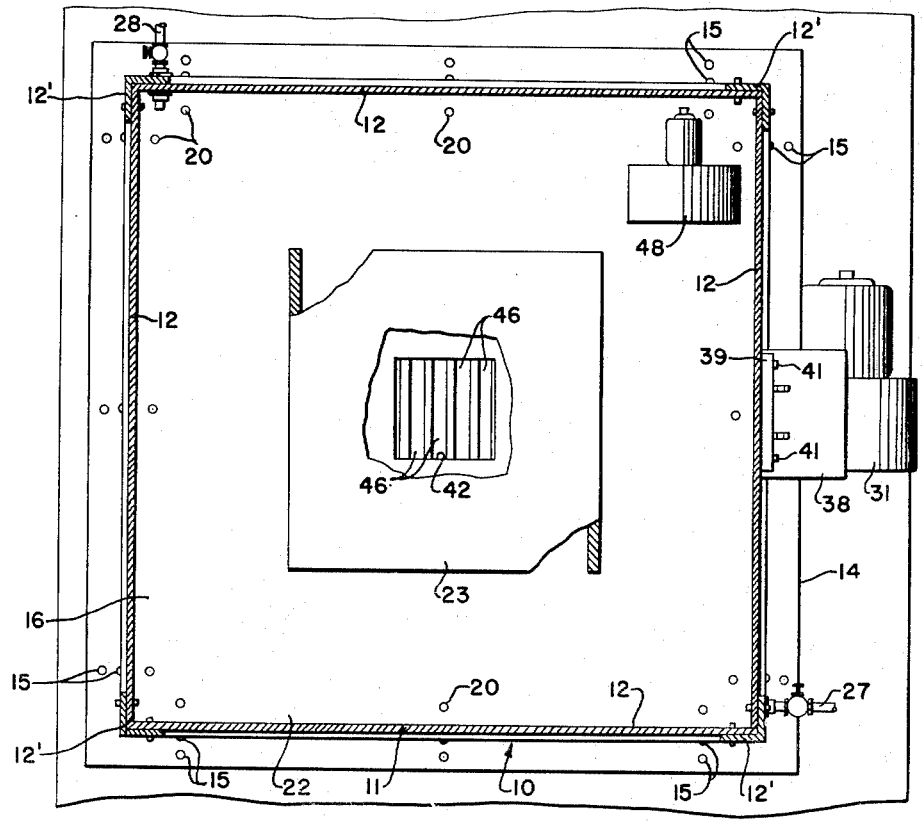
Figure 4:
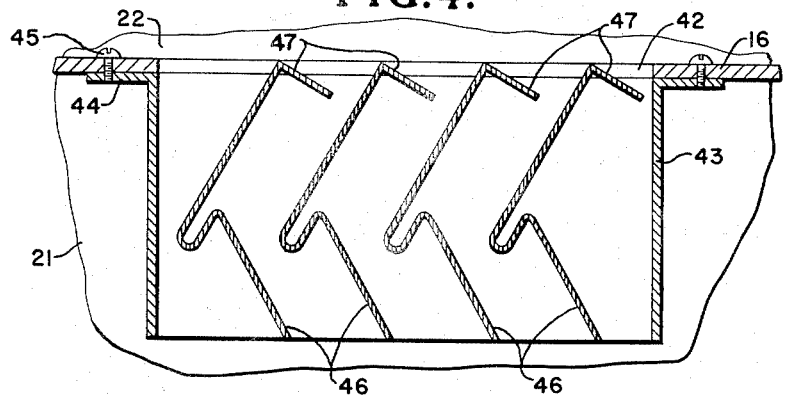
Fig. 4 is an enlarged sectional view of the structure.
Figure 3:
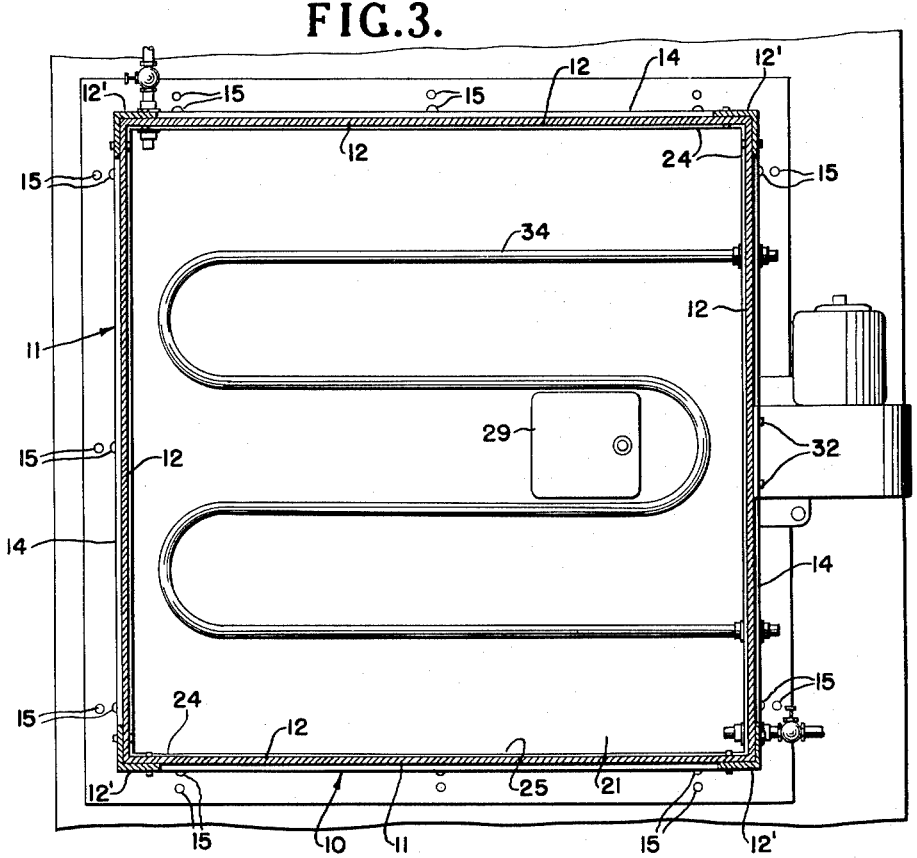

Referring now to the drawings and more particularly to Fig. 1 thereof, the humidity unit of the present invention is generally indicated by the reference character 10 and comprises a substantially rectangular casing 11, the walls 12 thereof being composed of any transparent material suitable for the purpose such, for example, as "Plexiglas" and secured together by corner member 12'. The walls 12 are supported on and secured to a base 13 by a flange member 14, the flange member being secured to the walls 12 and base 13 as at 15.

A partition 16 is disposed within the casing 11 substantially midway between the base 13 and a cover 17, the partition being supported within the casing by a flanged support 18 which is secured to the aforesaid casing as at 19 and to the partition as at 20. By this arrangement a pair of chambers 21 and 22 are formed within the casing 11, chamber 22 is the test chamber and 21 is the temperature control and vaporizing chamber.

As more clearly shown on Fig. 1 a rack 23 is disposed within the test chamber and supported on the partition 16, the rack being secured to the partition in any suitable manner. Furthermore, the rack is composed of a suitable non-corrosive material and is adapted to support the object or material, as the case may be, during the testing operation.

Supported on the base 13 and having the flanged portion 24 thereof in engagement with the walls 12 is a pan or vessel 25 having a quantity of water 26 therein, the water being supplied from an external water supply system by way of inlet pipe 27. The pan is provided with an outlet pipe 28 for drawing the water therefrom, if desired.

A suitable vaporizer or spray device 29 is arranged within the chamber 21 and within the pool of water 26, the spray device being secured to the pan 25 in any suitable manner. The spray device is adapted to spray a fine jet of water into the air stream as the air is blown therethrough by a blower 31 secured to the casing 11 and base 13 as at 32 and having the nozzle or outlet end thereof arranged within an opening 33 formed in the casing 11 and disposed in alignment with the spray water.

As shown more clearly on Fig. 1, an electric heater 34 is immersed within the water 26 and arranged in the electrical control circuit of the unit for heating the aforesaid spray water. The temperature of the spray water is controlled by a pair of pre-set thermostats 35 and 36 included in the aforesaid circuit whereupon the water may be heated to the desired temperature. The thermostat 35 is set to open and interrupt the circuit to the heater when the temperature reaches 91° F., while the thermostat 36 is adapted to operate to interrupt the circuit when the temperature reaches 82° F. Selection of the aforesaid thermostat may be accomplished by the use of a suitable timing device 37 whereupon the device will be operated at time intervals of 20 and 40 minutes. The timing device is arranged within a control box 38 secured to a terminal panel 39 which is secured to the casing 11 as at 41.

The partition 16 is provided with a centrally disposed port or opening 42 about which is arranged a hood 43 having a flanged portion 44 formed thereon in engagement with the partition and secured thereto as by bolts or rivets 45. Arranged within the hood 43 and secured thereto in any suitable manner such, for example, as by welding the parts together is a plurality of baffles or louvers 46. The louvers 46 are formed preferably of stainless steel sheets or the like and disposed in a plane at substantially right angles to each other and terminating in edge portions 47, extending at approximately right angles to the plane of one of the plane portions of the louvers and serving as a moisture collecting and draining means for removing a substantial amount of water particles from the air entering the test chamber 22 as the air passes the louvers and into the chamber by way of opening 42 in partition 16.

An air circulating or agitating fan 48 is arranged within the chamber 22, the fan being supported on the partition 16 and secured thereto as by bolts or the like 49.

As more clearly shown on Fig. 1, the cover 17 is provided with an exhaust port 51. Furthermore, the cover 17 is inclined toward of the side walls 12 of the casing 11. By the aforesaid inclined cover arrangement it will be understood that any condensed moisture which forms thereon during the testing operations will drain downwardly toward the aforesaid side wall of the casing thereby preventing the moisture from falling on the object or specimen and thus a more accurae and conclusive test may be accomplished.

A suitable control switch 52 is arranged within the control box 38 and is adapted to be moved from a normally open position to a closed position thereby to set the device in operation, the operation thereof being indicated by a pilot light 53 adapted to be lighted when the switch 52 is actuated to a closed position.

Figure 5:
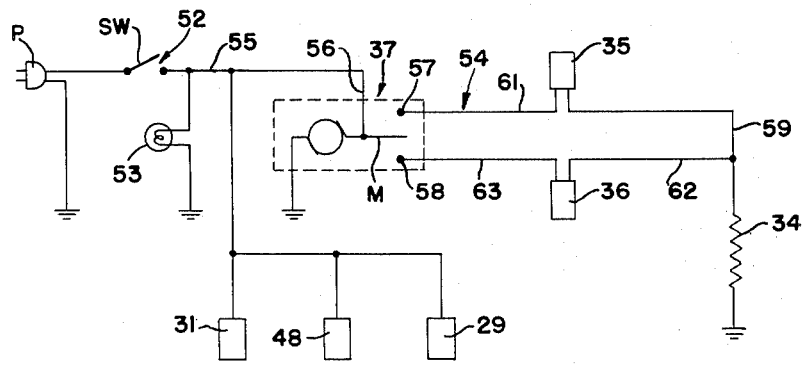
Fig. 5 illustrates in diagrammatic form a circuit arrangement suitable for use with the device of Fig. 1.

Referring now to the circuit arrangement of Fig. 5 for a more complete understanding of the operation of the device, the circuit arrangement is generally indicated by the numeral 54 and includes a plug P adapted to be plugged into suitable source of electrical energy whereupon the system may be set in operation as switch SW is moved from a normally open position to a closed position. The pilot light 53, blower 31, circulating fan 48 and vaporizer 29 are electrically connected to switch 52 by conductor 55 and are operated by the electrical energy from the source of power as switch SW is moved to closed position and concurrently therewith and in response to the closing of the switch SW the timing device 37 is operated in response to the aforesaid energy by way of conductor 56. It will be understood, however, that either thermostat 35 or 36 included in the timing circuit may be selectively chosen for operation as the timing device is actuated to a selected position, i. e., with the movable contact M thereof in engagement with one of the pair of contacts 57 or 58. Thermostat 35 is included in the timing circuit and electrically connected to the heater 34 by way of conductor 59 and to the contact 57 by way of conductor 61, the thermostat being adapted to open and interrrupt the circuit to the heater when the temperature reaches substantially 91° F. Thermostat 36 is included in the timing circuit and electrically connected to heater 34 by way of conductor 62 and to contact 58 by way of conductor 63 and is adapted to open and interrupt the circuit to the heater when the temperature reaches substantially 82° F. By the aforesaid thermostat and timing device arrangements it will be obvious that the desired temperature of the spray water may be maintained and the desired time period may be selected in accordance with the particular test cycle required. Thus the timer may alternately energize circuits 61 and 63 in any desired timed sequence. It will be understood, however, that the selected humidity cycle will continue repeatedly until switch SW is actuated to an open position.

From the foregoing, it will be apparent that the humidity cycle is accomplished, basically, by a temperature controlled water spray through which water at room temperature is forced by suitable blower means, the air being heated and/or cooled by the water spray, depending upon the specific type of specimen or material under test and the desired temperature conduction at which such specimen and material are adapted to be tested.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In a device for testing electronic equipment, in combination, a casing, a partition arranged within and secured to said casing and forming an air conditioning chamber and a test chamber, said air conditioning chamber having a quantity of water therein and said partition having a centrally disposed passage formed therein, blower means secured exteriorly on said casing for forcing air at room temperature into said air conditioning chamber, spray means arranged within the air conditioning chamber for supplying moisture to the air and conditioning the air during a testing operation, means including a heater disposed within said water for controlling the temperature of the water, a tubular element arranged vertically within said air conditioning chamber and secured to said partition in alignment with said passage, a plurality of baffles arranged within and secured to said tubular element in mutual spaced relation, a pair of inclined portions on each of said baffles and disposed in a plane substantially at a right angle with respect to each other, a pair of outwardly extending flange elements formed on each of said baffles for collecting a substantial amount of moisture from the conditioned air as the air is forced between the baffles through said passage and into said test chamber by said blower means, said inclined portions being adapted to divert the moisture collected by said flange elements into said conditioning chamber, port means on said casing in communication with said test chamber through which said conditioned air is exhausted, and a rack member disposed within said test chamber and supported on said partition above and in alignment with said passage and baffles for supporting said equipment and for preventing the moisture in the conditioned air forced into the test chamber from directly impinging on the equipment during a testing operation.

2. In a device for testing electronic equipment, in combination, a casing, a partition secured within said casing and forming an air conditioning chamber and a test chamber, said air conditioning chamber having a quantity of water therein and said partition having a centrally disposed opening therein, blower means secured exteriorly on said casing for forcing air at room temperature into said air conditioning chamber, spray means arranged within the air conditioning chamber for supplying moisture to the air and conditioning the air during a testing operation, means including a heater disposed within said water for controlling the temperature of the water, a tubular element arranged vertically within said air conditioning chamber and secured to said partition in alignment with said passage, a plurality of baffles secured within said tubular element and composed of thin sheet material, each of said baffles being bent upon itself intermediate the ends thereof to form a pair of inclined portions disposed in a plane substantially at a right angle with respect to each other and an outwardly extending flange at the junction of said inclined portions, a second flange formed on one of said pairs of inclined portions and extending at a right angle with respect thereto, said flanges being adapted to collect a substantial amount of moisture from the conditioned air as the air is forced between said baffles through said opening from said conditioning chamber into said test chamber by said blower means, said inclined portions being adapted to divert the moisture collected by said flanges into said conditioning chamber, port means in communication with said test chamber through which said conditioned air is exhausted, and a rack disposed within said test chamber and supported on said partition above and in alignment with said tubular element for supporting said equipment and for preventing said moisture in the conditioned air forced into the test chamber from directly impinging on the equipment during a testing operation.

References Cited in the file of this patent

UNITED STATES PATENTS

| | | |
|---|---|---|
| 1,616,802 | Hosch | Feb. 8, 1927 |
| 1,736,408 | Lauer | Nov. 19, 1929 |
| 1,834,534 | Richards et al. | Dec. 1, 1931 |
| 1,853,421 | Harris | Apr. 12, 1932 |
| 1,853,424 | Harris | Apr. 12, 1932 |
| 1,971,405 | Harris | Aug. 28, 1934 |
| 2,237,497 | Munford | Apr. 8, 1941 |
| 2,624,337 | Gibbon | Jan. 6, 1953 |
| 2,633,842 | Higgs | Apr. 7, 1953 |